C. J. TRAVERS.

TILTING CHAIR.

APPLICATION FILED OCT. 30, 1908.

12,900. Reissued Dec. 15, 1908.

Inventor:

Charles J. Travers,

By W. D. Duvall,

Attorney.

Witnesses:

T. E. Beall,

C. F. Duvall.

THE NORRIS PETERS CO., WASHINGTON, D. C.

UNITED STATES PATENT OFFICE.

CHARLES J. TRAVERS, OF CHICAGO, ILLINOIS, ASSIGNOR TO GILSON MANUFACTURING COMPANY, OF PORT WASHINGTON, WISCONSIN, A CORPORATION.

TILTING CHAIR.

No. 12,900. Specification of Reissued Letters Patent. Reissued Dec. 15, 1908.

Original application filed February 18, 1905, Serial No. 246,253. Divided and application filed March 23, 1906, Serial No. 307,566. Original No. 851,454, dated April 23, 1907. Application for reissue filed October 30, 1908. Serial No. 460,368.

*To all whom it may concern:*

Be it known that I, CHARLES J. TRAVERS, residing in Chicago, in the county of Cook and State of Illinois, have invented new and useful Improvements in Tilting Chairs, of which the following is a description, reference being had to the accompanying drawings, which are a part of this specification.

This case constitutes a division of my application for patent for revolving chairs filed Feb. 18, 1905; Serial No. 246,253.

This invention relates to tilting chairs and comprises novel features of construction by which the chair parts may be simply and cheaply manufactured and which render the chair more durable and efficient in use.

An object of the invention is to provide a spider for reclining chairs with sheet metal parts of novel construction and possessing various desirable features.

Another object of this invention is to provide the pivotal portion of a spider for reclining chairs with a suitable means for supplying lubricant thereto.

With the above and other objects in view the invention consists in the revolving chair, its parts and combination of parts as herein set forth, and their equivalents.

Figure 3:
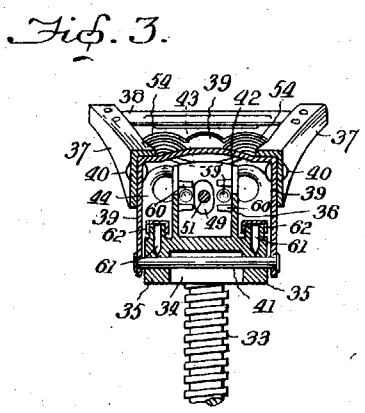
Figure 4:
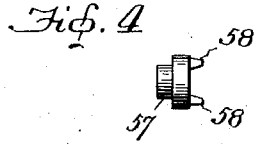
Figure 5:
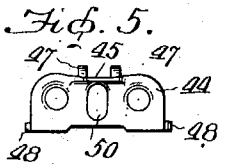
Figure 1:
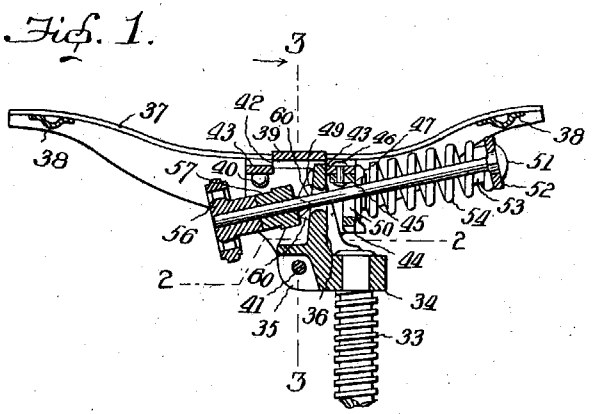
Figure 2:
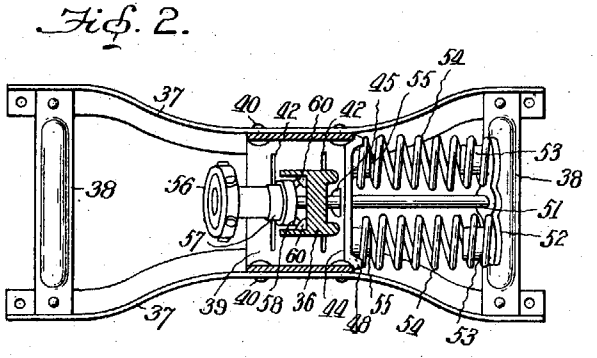

Referring to the accompanying drawings in which like characters of reference indicate the same parts in the several views:—Figure 1 is a central vertical sectional view of a chair spider constructed in accordance with this invention; Fig. 2 is a sectional inverted plan view thereof on the plane of line 2—2 of Fig. 1; Fig. 3 is a transverse sectional view of the spider on the plane of line 3—3 of Fig. 1; Fig. 4 is a detail view of the collar for the adjusting rod of the spider; Fig. 5 is a detail view of the bearing plate for the springs of the spider.

In these drawings 33 represents a threaded spindle at the upper end of which is a head or casting 34 which is rigidly mounted thereon and has a pair of forwardly extending pivot ears 35 and an integral upwardly extending projection 36 suitably braced by strengthening flanges.

A spider frame is formed by a pair of sheet metal side members 37, angular in cross-section, with their ends bent outwardly and upwardly to form the spider arms for connecting with the chair seat, and a pair of transverse members 38, also of sheet metal, connecting the front ends and the rear ends of the side members and having strengthening ribs pressed in their middle portions. A spreader 39, of sheet metal, connects the side members 37 at their intermediate portions, where they come close together, and where their side flanges, which taper toward each end, are the widest, and is secured to said side flanges by rivets 40 or other means. The spreader has downwardly bent ends embracing the head casting 34 at the pivot ears 35, and a pivotal pin 41 passes through said ends of the spreader and the pivot ears 35 to form the pivotal connection for the chair seat. The spreader 39 at its top portion is provided with a pair of slits 42, the strip of metal between them being bent upwardly to clear the upper end of projection 36 of the head casting 34 during the swinging movement of the chair seat, and the remaining strips of metal on either side of said slits being bent downwardly to constitute a pair of stops 43 standing in the path of said projection 36 and limiting the swinging movements of the chair seat.

A bearing plate 44 has an outwardly projecting flange 45 at its upper edge which bears beneath the strip or spreader 39 which forms the rear stop 43 and is secured thereto by a rivet 46 or by other means, and a pair of upwardly extending lugs 47 on said upper edge of bearing plate 44 bear against the rear edge of said strip of the spreader. The bearing plate 44 extends downwardly and is provided at the lower part of its side edges with offset lugs 48 to engage the rear edges of the downwardly extending ends of the spreader 39, to thoroughly brace said bearing plate in position.

The upright projection 36 of the head casting 34 is provided with a vertical elongated slot 49 and the bearing plate 44 is provided with a similar vertical elongated slot 50 registering therewith, so that an adjusting rod 51 may extend through both of said slots without binding therewith during the swinging movement of the chair seat. At its rear headed end the adjusting rod 51 carries a bearing plate 52 having projecting lugs 53 at its ends upon which are mounted a pair of coil compression springs 54 with their front ends surrounding similar lugs 55 on the bearing plate 44.

The compression springs 54 may be subjected to pressure by means of a hand nut 56 threaded on the front end of the adjusting rod 51 and bearing on a pivotal collar 57, which is loosely mounted on the adjusting rod 51 and has a pair of conical lugs 58 bearing in correspondingly shaped recesses 59 in the front surface of the projection 36 of head casting 34. The recesses 59 are located on opposite sides of the slot 49 to constitute a pivotal bearing for the collar 57 of the adjusting rod and enable said rod to swing in a vertical plane during the swinging movements of the chair seat. Each of the conical recesses 59 has a guard wall or flange 60 above and below it, so that when the hand nut 56 is loose on the adjusting rod there will be no liability of the pivotal collar 57 losing its proper engagement with the projection 36.

The pressure on the compression springs 54, applied by tightening the hand nut 56 on the adjusting rod 51, causes them to force the bearing plate 44 forwardly until the rear stop 43 is in engagement with the extension 36, and thereby hold the chair seat in its upright or forward position. When the chair seat is tilted back, the bearing plate 44 moves toward the bearing plate 52 and thereby increases the compression on the coil springs 54, so that such backward tilting of the chair seat is cushioned, and as the bearing plate also moves downwardly, the adjusting rod 51 is caused to swing on its pivotal bearings, formed by the conical lugs 58 in the recesses 59, to follow the swinging movements of the chair seat.

It is obvious that the degree of cushioning of the backward tilting of the chair seat may be varied by increasing or diminishing the compression of the coil springs 54 by tightening or loosening the hand nut 56.

One of the pivotal pin openings punched through the downwardly extending ends of the spreader 39 is made irregular in shape and the pivotal pin 41 is driven therein from the other side so that it will bind and be prevented from turning in said spreader ends and be required to turn in the pivot ears 35 as bearings. Each of said pivot ears is provided with a boss above the pivotal pin, and said bosses have cavities 61 therein leading to the perforations through which the pivotal pin extends and forming lubricating cups in which a supply of lubricant may be stored to be gradually fed to the bearings for the pivotal pin and keep said bearings well lubricated. A sheet metal cap 62 is fitted upon each of the bosses and is preferably crimped or spun thereon to prevent losing.

The sheet metal construction of the spider renders it cheap to manufacture, strong and durable in use, and much lighter than the cast metal construction.

The formation and mounting of the bearing plate 44 are such as to make it rigid with the chair seat, so that all movements of the chair seat will be imparted directly to the coil springs 54, and the construction of the stops 43 for limiting the movements of the chair seat, and the guard flanges 60 for preventing the pivotal bearings of the collar 57 becoming disengaged, as well as the lubricating feature for the pivotal pin 44, are all features of novelty.

What I claim as my invention is:—

1. In a revolving chair, the combination with a supporting head or casting having an upwardly extending projection, of a spreader having downwardly extending ends pivoted to said head or casting and having slits in its upper portion, said upper portion of the spreader being bent at either side of the slits to form stops which strike against the upwardly extending projection of the head or casting when the spreader is tilted.

2. In a revolving chair, the combination with a supporting head or casting having an upwardly extending projection, of a sheet metal spreader of inverted U-shape in cross-section pivoted at its lower ends to the head or casting and at its upper portion provided with transverse slits, said upper portion of the spreader being bent at either side of the slits to form stops which strike against the upwardly extending projection of the head or casting when the spreader is tilted.

3. In a revolving chair, a spider, comprising side members of sheet metal construction angular in cross-section with their ends bent upwardly and outwardly and their side flanges tapering from their middle portions toward each end, transverse members connecting the ends of the side members, a sheet metal spreader extending between and connected to the side members at their intermediate portions and having downwardly bent ends, said spreader having a pair of slits in its top portion with the strip between them bent upwardly and the strips on each side of them bent downwardly, a pivotal pin connecting the downwardly bent ends of the spreader, a head through which the pivotal pin passes, and a projection on the head adapted to extend beneath the upwardly bent strip of the spreader and engage the downwardly bent strips thereof to limit the pivotal movements of the spider.

4. In a revolving chair, a spider, comprising a pair of side members, a spreader connecting the two side members and having downwardly extending ends, a pivotal pin connecting said downwardly extending ends of the spreader, a head in which the pivotal pin is also mounted, a projection on the head, said spreader having a pair of slits with the strip of metal therebetween bent upwardly and the strips of metal on either side thereof bent downwardly to form a pair of stops between which the projection of the head may pass and which will engage said projection to limit the movements of the spider, a bearing plate having a flange bearing beneath one of the said downwardly bent strips of metal and connected thereto, a lug on the bearing plate bearing against the edge of said downwardly bent strip of metal, said bearing plate and projection having registering elongated slots, an adjusting rod passing through said slots, a bearing plate carried by the adjusting rod, lugs formed on the bearing plates, a coil spring mounted on the lugs between the bearing plates, a collar mounted on the adjusting rod and having a pivotal bearing on the projection, and a hand nut threaded on the adjusting rod and adapted to adjust the compression of the coil spring.

5. In a revolving chair, a spider, comprising a spreader with downwardly extending ends, a head to which the said downwardly extending ends are pivotally connected, a projection on the head, a bearing plate carried by the spreader, said bearing plate and projection having registering openings, an adjusting rod passing through the said openings, a bearing plate on the adjusting rod, a coil spring mounted between the bearing plates, a collar mounted on the adjusting rod, a pair of conical lugs on the collar bearing in corresponding conical recesses in the projection to form a pivotal connection for the adjusting rod, a pair of guard flanges formed on opposite sides of the conical recesses to prevent the disengagement of the conical lugs therewith, and a hand nut threaded on the adjusting rod by which the compression of the coil spring may be adjusted.

6. In a revolving chair, a spider frame having a spreader with downwardly extending ends, a pivotal pin connecting said downwardly extending ends of the spreader and prevented from turning therein, a head loosely mounted on the pivotal pin between said downwardly extending ends of the spreader and having a pair of pivot ears forming the bearings for said pivotal pin, bosses on the pivot ears having cavities leading to the pivotal pin and adapted to contain a supply of lubricant for the pivotal pin, and caps secured to the bosses to cover the cavities thereof.

7. In a revolving chair, a spider, comprising a pair of side members, a spreader connecting the two side members and having downwardly extending ends, a head to which the spreader is pivoted, and a projection on the head, said spreader having a pair of slits with the strip of metal therebetween bent upwardly to receive the projection and the strips of metal on either side thereof bent downwardly to form a pair of stops for engaging the projection and limiting the movements of the spider.

In testimony whereof, I affix my signature, in presence of two witnesses.

CHARLES J. TRAVERS.

Witnesses:
A. C. TVELDTE,
A. E. DOMMER.